(12) United States Patent
Laurila et al.

(10) Patent No.: US 6,691,090 B1
(45) Date of Patent: Feb. 10, 2004

(54) SPEECH RECOGNITION SYSTEM INCLUDING DIMENSIONALITY REDUCTION OF BASEBAND FREQUENCY SIGNALS

(75) Inventors: Kari Laurila, Tampere (FI); Jilei Tian, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 365 days.

(21) Appl. No.: 09/694,491

(22) Filed: Oct. 24, 2000

(30) Foreign Application Priority Data

Oct. 29, 1999 (GB) ............................................. 9925676

(51) Int. Cl.$^7$ ............................................. G10L 15/02
(52) U.S. Cl. ................... 704/250; 704/256; 704/205
(58) Field of Search ................................ 704/250, 256, 704/263, 204, 205, 255

(56) References Cited

U.S. PATENT DOCUMENTS

| | | | |
|---|---|---|---|
| 4,283,601 A | 8/1981 | Nakajima et al. | 179/1 |
| 5,946,656 A * | 8/1999 | Rahim et al. | 704/256 |
| 6,278,970 B1 * | 8/2001 | Milner | 704/203 |

FOREIGN PATENT DOCUMENTS

WO    WO9843237    10/1998

OTHER PUBLICATIONS

R. Chengalvarayan, "Hierarchical Subband Linear Predictive Cepstral (HSLPC) Features for HMM–Based Speech Recognition", Speech Processing Group, IEEE 1999, pp. 409–412.

S. Okawa, et al, "Multi–band Speech Recognition in Noisy Environments" AT&T Labs–Research, IEEE 1998, pp. 641–644.

K. Paliwal, "Dimensionality Reduction of the Enhanced Feature Set for the HMM–Based Speech Recognizer" Digital Signal Processing 2, No. 3, 157–173, 1992.

S. Vaseghi, et al Multi–resolution Phonetic/Segmental Features and Models for HMM–based Speech Recognition, IEEE International Conference on Acoustics, Speech and Signal Processing, 4/97, pp. 1263–1266.

* cited by examiner

Primary Examiner—Susan McFadden
(74) Attorney, Agent, or Firm—Antonelli, Terry, Stout & Kraus, LLP (57) ABSTRACT

A method for use in a speech recognition system in which a speech waveform to be modelled is represented by a set of feature extracted parameters in the time domain, the method comprising dividing individual ones of one or more of said feature extracted parameters to provide for each divided feature extracted parameter a plurality of frequency channels, and demodulating at least one of the plurality of frequency channels to provide at least one corresponding baseband frequency signal.

15 Claims, 6 Drawing Sheets

FIG. 7b
EMBODIMENT OF THE PRESENT INVENTION

FIG. 7a
PRIOR ART

SPEECH RECOGNITION SYSTEM INCLUDING DIMENSIONALITY REDUCTION OF BASEBAND FREQUENCY SIGNALS

BACKGROUND OF THE INVENTION

The present invention relates to speech recognition. More particularly, the present invention relates to speech recognition in a radio communication system and/or in a Distributed Speech Recognition (DSR) system.

The main objective of speech recognition is to provide quick and easy access to a wide variety of computer services and communication systems by using human speech. Speech recognition applications range from simple voice control using a limited number of basic command words, like "yes" or "no", or numbers from zero to nine, to much more flexible systems capable of turning spontaneous speech into written text, i.e. dictation systems. In dictation-like applications the vocabulary is typically very extensive, containing tens of thousands of words, and thus in such systems, which are known as Large Vocabulary Continuous Speech Recognition (LVCSR) systems, computational complexity and memory requirements are very high.

A general speech recognition system can roughly be divided into two main parts. First the most important characteristics of the speech signal are captured in a pre-processing stage called feature extraction, and this part of the speech recognition system is called the front-end (FE). The front-end converts a sampled speech waveform into a representation more suitable for recognition purposes. Feature extracted parameters, known as feature vectors, are then fed into the recogniser or back-end (BE), which performs the actual probability estimation and classification, that is to say, the back-end carries out the recognition and outputs the result. The more complex the recognition task, the more important it is to have good quality feature vectors. Variation in speech owing to different speakers having for instance different dialects, or talking at different speeds are factors which affect a speech recognition system. Environmental noise and distortion are further factors which deteriorate the quality of feature vectors, and in turn, influence the performance of the speech recognition system as a whole. Although the FE can provide some robustness against these factors, the quality of the speech fed to the FE is critical.

Speech recognition technology is growing in its application in mobile telecommunications. Cellular phones that are able to make a call by simply listening to the phone number or the name of the person the user wants to talk to are already available. However, more complex tasks, such as dictation, are still very difficult to implement in a mobile environment. Since it is crucial to provide the recogniser with as good quality speech as possible, it would seem logical to try to place the recogniser as close to the user as possible, i.e., directly in the telephone handset. However, the computational load and memory demands of LVCSR do not make this a viable approach.

To address these problems, it has been proposed to place the BE at a central place in the cellular network, whilst the FE part, with its comparatively low computational demands, can be located in the telephone handset. In this way it is possible to take advantage of high performance computers in the cellular network which can be shared by many users at a time. This type of arrangement of a speech recognition system over the network is referred to as Distributed Speech Recognition (DSR). In DSR, it is proposed that the speech signal is transformed into feature vectors locally at the handset and these are transmitted as digital data over the transmission channel relatively free of errors. When feature vectors are extracted at the handset, the BE can operate on the data stream, or sequence of feature vectors which usually represent high quality speech, and can therefore achieve good recognition performance.

A commonly used approach for carrying out feature extraction is the cepstral approach, and using this approach the feature vectors that are extracted are called mel-frequency cepstral coefficients or MFCCs. The basis for the cepstral approach is basically related to the nature of the speech signal itself and particularly concerns the distortions it undergoes during the first stages of its acquisition and processing. It is widely accepted, that the speech signal is contaminated with a number of convolution noise sources, i.e in the generation and acquisition of the speech signal, a number of factors cause the speech to be altered in such a way that the disturbance to the signal can be modelled as a mathematical convolution between the speech signal and each of the disturbing factors.

The first of these arises due to the physiological processes involved in the formation of human speech. The driving force of the speech formation process is air expelled by the lungs. It is argued that because the human respiratory tract, including the lungs themselves, the trachea, the pharyngeal, oral and nasal cavities, has a certain geometry, it has a natural frequency response, or acoustic transfer function. This can be thought of in the same terms as the transfer function of an electronic circuit. Just as the transfer function of an electronic circuit becomes convoluted with an electrical signal that is applied to the circuit, so the periodic vibrations of the vocal chords, which form the speech signal, undergo a convolution with the acoustic transfer function of the human respiratory tract. In other words, the geometry of the respiratory tract can be thought of as giving rise to a convolutional 'noise' source that distorts the speech signal. Furthermore, when the speech signal is detected, for example using a microphone, and transferred to some input circuitry for amplification, the transfer functions of the microphone, the transmission line and the amplifier circuitry also become convoluted with the speech signal. There are also likely to be a number of additive noise sources, for example background or environmental noise detected by the microphone along with the speech signal.

Therefore, when processing a speech signal, the problem of minimising the effect of the convolutional and additive noise must be addressed. Electronic filters can be designed to reduce the effect of additive background noise, although this in itself may be complicated, as the nature of the background noise may vary significantly from location to location and also as a function of time. However, filtering cannot be used to reduce the effect of convolutional noise and by their very nature, the analysis of convoluted signals in the time domain is very complicated.

It is known that a convolution operation in the time domain can be transformed into a multiplication operation in the frequency domain by applying a Fourier transform to the time domain signal. This is a standard approach used in a wide variety of digital signal processing applications, for example to analyse the transfer functions of filters etc. Typically, in DSP applications, a Fourier transform is performed using a Fast Fourier transform (FFT) algorithm which is computationally very much more efficient than a Discrete Fourier transform (DFT).

Performing an FFT is also the first step in forming a cepstral representation of a time domain signal. In transforming the speech signal into the frequency domain using a Fourier transform, convolutional effects, such as the distortion in the speech signal due to the acoustic properties of the human respiratory tract, are converted into multiplicative factors. The next step in calculating a cepstral representation of a speech signal is to take the logarithm of the Fourier transformed speech signal. A further Fourier transform is then performed to produce the cepstrum. In speech processing applications, a Discrete Cosine Transform (DCT) is often used instead of an FFT at this stage, because it offers a further increase in computational efficiency. In the cepstrum, all of the effects of time-domain convolutions are reduced to additive terms and it can be shown theoretically and experimentally that this kind of representation of speech signal provides a much more reliable representation than conventional frequency domain representations.

Figure 1:
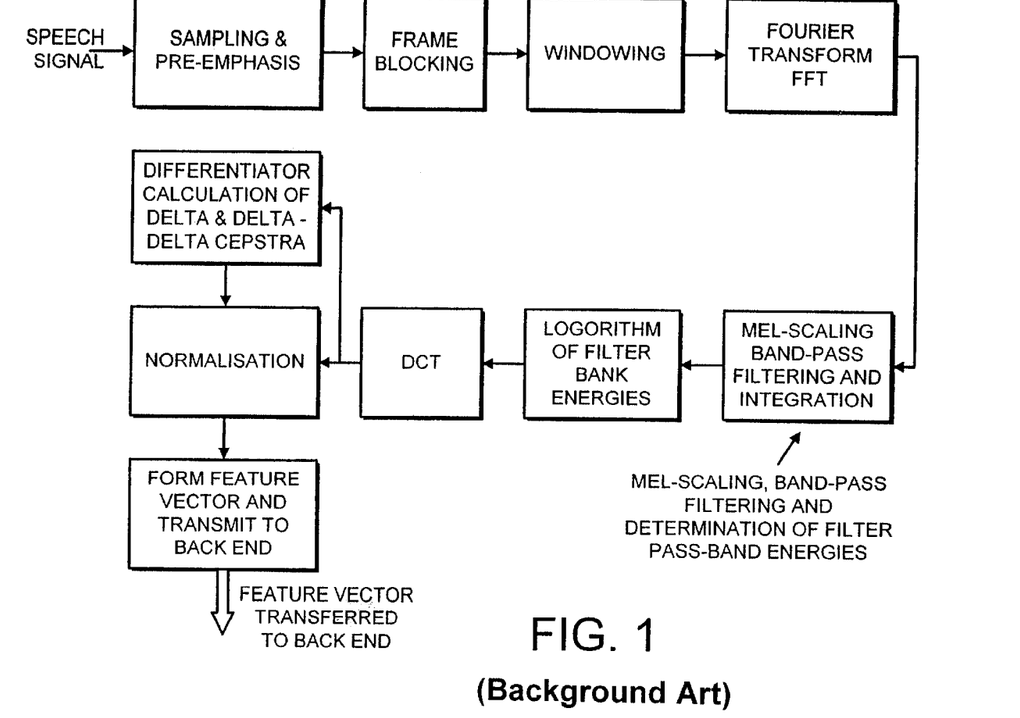
FIG. 1 illustrates in block diagram a prior art approach for generating mel-frequency cepstral coefficients.

A block diagram of the cepstral approach in the context of the front end is given in FIG. 1. This shows the basic steps required to obtain a representation of a continuous speech waveform as MFCCs. Typically, the speech is first sampled and pre-emphasised with a low order high-pass filter, and then segmented into 30 ms frames with 10 ms spacing. Each frame is multiplied with a 30 ms Hamming window before a Fast Fourier transform is computed. A set of triangular band-pass filters is applied to the FFT power spectrum according to the non-linear mel-frequency scale. The MFCC features are obtained by taking a truncated discrete cosine transform (DCT) of the logarithm of the filter bank energies.

The purpose of the set of band pass filters is to further reduce the amount of information required to represent the frequency spectrum of the speech signal. Typically, speech is coded in frames, each representing a certain finite period of speech signal. This approach, in itself, takes advantage of the temporal redundancy of speech signals. It can be shown experimentally that human speech waveforms are rather slowly varying and that over a period of 20–30 ms, the characteristics (amplitude and frequency) of speech waveform are substantially stationary. Thus, it is sensible to process the speech signal in units of this length, as little information can be gained by analysing shorter periods. Therefore, speech is often processed in frames of 30 ms duration.

As explained previously, a Fast Fourier transform is applied to each speech frame to provide a frequency domain representation of the speech signal. This necessarily represents the average frequency domain behaviour of the speech signal over the duration of the speech frame. Furthermore, because the speech frame comprises a set of samples rather than a continuous time domain signal, the resulting frequency spectrum has a finite frequency resolution. This is a consequence of basic sampling theory. The frequency spectrum comprises a number of frequency 'bins', each encompassing a certain finite frequency range. The width of each bin is inversely proportional to the sampling rate times the number of samples in a frame. This means that there is an inverse relationship between the resolution of the frequency spectrum and the total sampling time; the longer the sampling time, the higher the resolution of the frequency spectrum.

In a typical speech recognition front end, the speech signal is sampled at a frequency of a few tens of kilohertz (e.g. 10–20 kHz). For example, if a 20 ms speech frame is sampled at 10 kHz, each frame is represented by 200 samples. When this sampled time domain data is transformed into the frequency domain using some form of discrete Fourier transform or the like (e.g. FFT or DCT), the resulting spectrum comprises the same finite number of samples. Each sample now represents an average amplitude for a certain frequency bin of the spectrum and the frequency resolution of the spectrum is fundamentally limited by the sampling process. In the example given here, the width of each frequency bin is 50 Hz. At first this appears to be rather a coarse frequency representation. However, because of the nature of the speech signal itself, this limitation is essentially unimportant, as explained below.

It is commonly accepted that there are three states in speech, each determined by the state of the speech production source i.e. the vocal chords. The first state is silence (S) where no speech is produced. The second state is termed 'unvoiced' (U) and this characteristic of a condition in which the vocal cords are not vibrating, but some sound is being produced and the third state is called the 'voiced' (V) state in which the vocal chords are vibrating. Typically, when a speaker begins to utter a word, there is a brief transition from the silent state to an unvoiced state, as air starts to be expelled from the lungs, and then there is a second transition to a voiced state. Finally, when the word has been uttered, there is a further brief transition to an unvoiced state as aspiration is completed and then a return to silence. In the unvoiced state the speech waveform is characteristically low amplitude and aperiodic, while in the voiced state the speech waveform tends to have a quasi-periodic appearance. In other words, during the voiced part of the speech the speech waveform typically contains only a few dominant harmonic components, the frequency content of which, as mentioned above, tends to change gradually with time.

Because of the quasi-periodic nature of the voiced speech signal, its frequency spectrum tends to exhibit a limited number of dominant harmonic components. Therefore, a comparatively accurate representation of the voiced speech signal can be obtained by dividing the frequency domain into a limited number of frequency bands and measuring the average signal amplitude (or signal power/energy) in those bands. This is done by applying the set of band-pass filters to the frequency spectrum of the speech signal. The band-pass filtering can be performed in a number of ways, for example, by dividing the frequency spectrum into a number of equal frequency spans. However, a more accurate representation of the speech signal can be obtained by using a non-uniform division. In this approach, the frequency spectrum is divided into a given number of frequency spans, the width of the spans progressively increasing with frequency. Furthermore, the transfer functions of the band-pass filters used to divide the spectrum can take a number of different forms. Typically, triangular transfer functions are used. The pass-bands could also be overlapping or non-overlapping.

As just mentioned, a better representation of the speech signal can be obtained by using a non-uniform division of the frequency spectrum. One method commonly used in the cepstral approach is a division according to the so-called mel-frequency scale. Psychophysical studies have shown that human perception of the frequency content of sounds, either for pure tones or speech signals, follows a non-linear scale. This is the 'mel' frequency scale. For each tone with an actual frequency, f, measured in Hertz, there is a corresponding subjective frequency measured in mels. As a reference point, the pitch of a 1 kHz tone, 40 dB above the perceptual hearing threshold is defined as 1000 mels. Other subjective pitch values are obtained by adjusting the frequency of a tone so that it is half or twice the perceived pitch of a reference tone with a known mel frequency. It has been demonstrated that above 1 kHz, subjective pitch is essentially proportional to the logarithm of actual frequency. This is in correspondence with the known structure of the human cochlea and its nervous projection onto the auditory cortex, which have been shown to have a clearly logarithmic mapping.

The Fourier spectrum of each speech frame is divided into L frequency bands according to the mel-frequency scale. Typically, L=13, but the method can be applied to any given value of L. As described above, this division into frequency bands is performed using a set of band-pass filters. The centre frequencies and pass-bands of the filters are chosen according to the non-linear mel-frequency scale and typically the filters have a triangular pass-band (i.e. frequency response/transfer function). The energy of each frequency band is then calculated (i.e. each frequency band is basically integrated to determine the average signal power in the bandwidth defined by each filter). Then the logarithm is taken of each energy value and a Discrete Cosine Transform (DCT) is performed. Because there are L filter bank energies, performing a DCT on the logged filter bank energies generates L DCT coefficients. These are the Mel-Frequency Cepstral Coefficients and of course, in the situation where L=13, thirteen MFCCs are generated. Typically, when L=13, the speech recognition system uses twelve MFCCs plus an additional energy measure, such as 0th cepstral coefficient ($c_0$) or logarithmic signal energy (logE).

In a typical distributed speech recognition system, it is information about the Mel-frequency Cepstral Coefficients that is sent to the back end of the speech recogniser and which is used by the back end to identify the content of the original speech signal. The coefficients are often referred to as 'features' and typically they are formed into a data unit known as a 'feature vector' for transmission to the back end. A feature vector is sent to the back end every time a new cepstrum is calculated i.e. every speech frame is processed to form a feature vector. Often, additional information concerning the time derivatives of each MFCC is also provided. For example, a feature vector may also contain information about the first and second time-derivatives of each cepstral coefficient. A conventional method for incorporating temporal information into speech vectors is to apply linear regression to a series of successive cepstral coefficients to generate first and second difference cepstra, referred to as 'delta' and 'delta-delta' cepstra (as indicated in the dashed part in FIG. 1).

Before transmission of feature vectors to the back end of the DSR system, an optional normalisation process may be performed. Normalisation in the feature vector domain tends to mitigate any degradation in speech recognition performance due to a possible mismatch between training and test environments. With normalisation, short term means and variances of each feature vector component are set to zero and one respectively regardless of environments. This process is the subject of European patent application no. 98660024.5.

It is useful to consider the MFCCs as a measure of speech signal power/energy in different frequency bands. The use of such a measure is justified because changes in MFCC values have been found to correlate well with changes in vocal tract shape and thus provide a good representation of the different sounds present in speech signals. Therefore, MFCCs offer a potentially accurate measure by which to quantify (e.g. recognise) speech signals. The MFCC representation provides a more robust description of speech signals in the presence of convolution noise sources, as these are reduced to additive noise sources by taking the logarithm of the FFT of the speech signal. Furthermore, as voiced speech tends to contain a small number of slowly evolving harmonic components, it is appropriate to integrate the frequency spectrum in some way, in order to obtain a measure of the signal power/energy in some limited number of frequency bands. Because of the fundamental nature of the voiced speech signal, such an approach should retain sufficient information, while effectively reducing the amount of data required to represent the speech signal.

In speech recognition applications, a cepstral representation of the speech signal is calculated for every speech frame and a set of MFCCs is extracted from each consecutive cepstrum. In other words, the cepstral representation of the speech signal is sampled in the time domain and thus changes in MFCCs can be examined as a function of time. In the methods described herein (both according to prior art and according to the preferred embodiment of the invention), a cepstrum (i.e. a new set of L MFCCs) is calculated eg. every 10 ms, using a speech frame of 30 ms duration. Effectively, the cepstral sampling interval is 10 ms. As explained earlier, it is customary to use 13 MFCCs, but application of the method is not limited to this number of MFCCs. Furthermore, it is possible to calculate cepstra more or less frequently and to use longer or shorter speech frames. However, as already mentioned, there are certain limits on the length of the speech frame that it is appropriate to use, due to the natural time scale of variations in the human speech signal. This means that, in practice, the usable range of speech frame durations is between approximately 20 and 30 ms.

If MFCC feature vectors are calculated every 10 ms, the mel-cepstrum has, in theory, time-varying components in the range of 0 Hz to 50 Hz. As previously described, it is customary to form speech frames in an overlapping manner. Typically, the frame length is 30 ms and the time shift between frames is 10 ms, i.e. the starting point of each new frame with respect to the speech data is shifted forward in time by 10 ms. Therefore, the actual frame overlap is 20 ms.

It is this 10 ms shift which gives rise to time-varying components in the mel-cepstrum. Because each new speech frame is separated from the previous one by a 10 ms shift, this is equivalent to saying that changes in the cepstral coefficients are being sampled with a frequency of 100 Hz. According to the Nyquist sampling theorem, the maximum frequency that can be represented correctly in a sampled data sequence is equal to one half of the sampling rate. Applying this general rule to the changes in cepstral coefficients sampled at 100 Hz, the maximum rate of change that can be measured is 50 Hz.

As described above, sets of MFCCs are computed at regular intervals (e.g. every 10 ms and the changes in each MFCC are monitored over time). In other words, a set of L time series is generated, each representing the evolution of one of the MFCCs with time. Information about these time series is fed to the back end of the speech recogniser and is applied to the speech model in order to identify the speech signal. Because new sets of MFCC values are calculated at fixed intervals (e.g. every 10 ms), each of the L time series is periodically updated with a new MFCC value at that same fixed interval. As mentioned, according to Nyquist's Sampling Theorem, when a continuous function is sampled at a frequency $f_s=1/T_s$ where $T_s$ is the sampling interval, the maximum frequency component of the original signal that can be represented is $f_c=f_s/2=1/2T_s$. Each of the L time series representing the variation in one of the MFCCs is such a sampled function. The MFCC values vary continuously in time, but because it is only possible to obtain updated measures of the MFCCs at fixed intervals of e.g. 10 ms, the result is a sampled version of the true variation. If the sampling interval is 10 ms, the Nyquist Theorem tells us that the maximum frequency of variations in each of the MFCCs that can be represented is $1/(2\times0.01s)=50$ Hz. This relationship, enunciated in the Nyquist Theorem is, however, only a theoretical upper limit on the frequency components that can be represented in any sampled signal. In the example given here, where the theoretical maximum frequency is 50 Hz, taking one sample every 10 ms only provides 2 samples per cycle of a 50 Hz waveform. In practice, a sampling rate that yields only two samples per cycle is insufficient to obtain a completely accurate representation of the waveform. This is especially true in situations where detailed information about the form of higher frequency variations in a signal is required.

After appropriate compression, mel-frequency cepstral coefficients are transmitted to the back-end where the speech is modelled. The compression mentioned here is actually channel coding i.e. the MFCCs are coded in such a way that they can be transferred/transmitted to the back end in an efficient manner, perhaps e.g. using the minimum number of bits. This is particularly important in a mobile wireless environment, where the bandwidth available for the transmission of feature vectors is limited. It should be remembered that the data to be transferred typically comprises at least the L feature vectors themselves plus two sets of values from the delta and delta-delta cepstra, each comprising L coefficients. Thus, in general, 3×L coefficients must be transferred for each frame of the speech signal. This means that the 3×L coefficients must be transmitted in substantially less than the cepstral sampling interval (e.g. 10 ms), as a certain amount of time is inevitably required in order to process each speech frame and extract the cepstral coefficients and the derivative terms. Thus, an efficient means of compressing the feature vectors for transmission is required. A standard form of channel coding, such as the CELP (code-excited linear perdictive) method, or one specifically designed for the efficient coding of mel frequency cepstral coefficients, could be used for this purpose.

At the back end, speech is normally modelled using a Hidden Markov Model (HMM). Hidden Markov Models (HMM) are a statistical tool commonly used in speech recogntion applications. The fundamental assumption of the Hidden Markov Model is that the speech signal can be characterised as a parametric random process, and that the parameters of said random process can be determined in a precise, well-defined manner. In basic terms, according to the Hidden Markov Model, a system can be modelled by N distinct states. At certain regularly spaced, discrete times, the system undergoes a change of state (possibly back to the same state) according to a set of probabilities associated with the state. Each state is assumed to be quasi-stationary, modelled by Gaussian densities (or other parametric densities) estimated from training material.

The task of the Hidden Markov Model in speech recognition is to identify spoken words. Here at least two different approaches can be taken, the model can be used to identify complete words, or it can be used to identify consonant and vowel sounds. Then the identification of a given word relies on the correct identification of its component sounds. This is termed a phoneme-based approach. Whichever approach is taken, parameters characterising the speech signal must be used in order to enable identification of the words/sounds. In many cases, these parameters are the mel frequency cepstral coefficient feature vectors (MFCCs). In order to set up the Hidden Markov Model so that it can identify either whole words or phonemes, it is necessary to 'train' the model. At this stage the various states of the model are defined, as well as the transitions between states. Training data is applied to the model. This takes the form of multiple utterances of the words/phonemes that comprise the desired vocabulary of the speech recogniser, each word/phoneme being characterised by its MFCC feature vectors, or whatever appropriate parameters have been chosen. Because there is a known relationship between the training data and its parametric representation, the model is able to 'learn' that relationship. Furthermore, because multiple utterances of each word/sound are used, the model is also able to learn the statistical variation in the parameters relating to each word/sound. If multiple speakers are used in the training process, account can also be taken of inter-individual differences.

Having learnt the parameters associated with each desired word/phoneme as well as their statistical variation, the model can then be used on 'test' data. 'Test' data is the term generally used to describe the unknown words or sounds which should be identified by the recogniser. By analysing the parameters (e.g. MFCCs) associated with the test data, the HMM can decide which of its states most closely resembles the test parameters and outputs a result corresponding to its identification of the unknown word/phoneme. Once defined during the training process, the states of the HMM usually remain fixed. However, 'adaptive learning' is also possible, in which case the Hidden Markov Model continues to refine the definition of its states using the test data. This offers the possibility of continual refinement of the recognition process.

The most basic approach in the prior art is to simply transfer each of the MFCC values to the back end and apply those to the Hidden Markov Model. In other words, every time a new set of MFCCs is derived from the speech signal (e.g. every 10 ms), the values are placed in a feature vector and that vector is transferred to the back end and applied to the HMM. The HMM then uses the values contained in the feature vector to determine which state it should adopt.

The fundamental problem with this basic prior art method is that a cepstral sampling interval of 10 ms provides too little information about the higher frequency variations in MFCC values. As a result, some researchers have concluded that higher frequency variations in the MFCCs are not significant in improving speech recognition accuracy. Experiments have been performed in which variations in MFCCs have been restricted to different frequency bands (i.e. DC–$f_{max}$, where $f_{max}$ is some upper frequency limit) and a comparative assessment of speech recognition accuracy has been made. It was found that above a certain value of $f_{max}$ (about 16 Hz) no further improvements in speech recognition accuracy are obtained. This has led to a widely held belief that variations in MFCCs above 16 Hz do not significantly contribute to improvements in speech recognition accuracy and that therefore there is no useful information in such higher frequency signals.

SUMMARY OF THE INVENTION

Figure 2A:
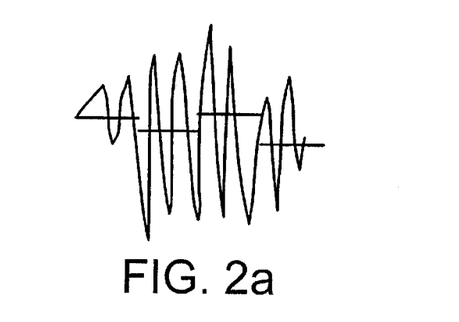
FIG. 2 illustrates two different frequency signals modelled with an HMM using a quasi-stationary assumption.
Figure 2B:
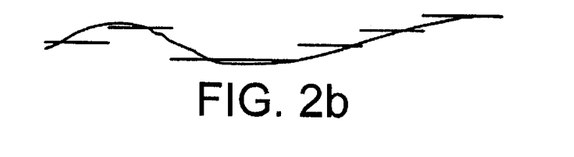

From their research, the present inventors have recognised that this common belief fails to realise that the customary 10 ms sampling does not provide sufficient high frequency information for the Hidden Markov Model in the back end of the speech recogniser to work efficiently. Furthermore, one of the fundamental assumptions of the Hidden Markov Model is that the states defined in the model are quasi-stationary. This means that states cannot change quickly compared with the cepstral sampling rate i.e. by their very nature HMMs cannot follow changes in MFCCs which are moderate/rapid compared with the cepstral sampling rate. Thus, the quasi-stationary assumption of states can be viewed as a weakness in HMM theory. In order to obtain reliable estimates for the model parameters, it is preferable to have as many feature vectors as possible for each state in the training material. On the one hand, the duration of the state should be as long as possible so that many adjacent feature vectors are assigned to that particular state, otherwise there should be as much training material as possible. However, on the other hand, states should not be very long since speech can be considered stationary only for a very limited period of time. A quickly varying signal cannot be accurately modelled by mean and variance only (parameters of Gaussian density). FIG. 2 of the accompanying drawings shows how well HMMs are able to model fast and slowly varying signals. It is clear that a quickly changing signal (FIG. 2a) in which many adjacent values are modelled with the same mean value (0'th order line), is not as well modelled as a more slowly varying signal (FIG. 2b). Thus, the conventional method of generating feature vectors does not enable efficient use of higher frequency information.

Accordingly, the inventors have recognised that it is the usefulness of Hidden Markov Models that is limited, in that HMMs cannot provide effective modelling (if at all) of more rapidly varying cepstral coefficients. They have noted that in a typical HMM, 3 to 5 consecutive speech frames are assigned to the same state, resulting in down-sampling by a factor of three to five. This, in turn, means that the maximum rate of change of MFCCs modelled by a typical HMM is between 10 Hz and 16 Hz. This is why cepstral frequencies beyond 16 Hz have been found to be of minimal use in improving recognition accuracy. Thus, the inventors have concluded that, whilst there may be useful high frequency information in speech, it cannot be modelled effectively within the current HMM framework.

The present invention aims to address the problems outlined above.

Accordingly, in one aspect, the present invention provides a method for use in a speech recognition system, in which a speech waveform to be modelled is represented by a set of feature extracted parameters, the method comprising dividing individual ones of one or more of said feature extracted parameters to provide for each divided feature extracted parameter a plurality of frequency channels, and demodulating at least one of the plurality of frequency channels to provide at least one corresponding baseband frequency signal.

By means of the invention, it is possible to represent higher frequency variations in MFCCs in a manner significantly more suitable for the HMM framework.

The invention is based on the idea that higher frequency variations in MFCCs can be demodulated without loss of information to lower frequencies that can be better modelled by a speech recogniser, e.g. using a Hidden Markov Model.

BRIEF DESCRIPTION OF THE DRAWINGS

The present invention will now be described by way of example with reference to the followings drawings in which.

DETAILED DESCRIPTION OF THE INVENTION

Figure 4:
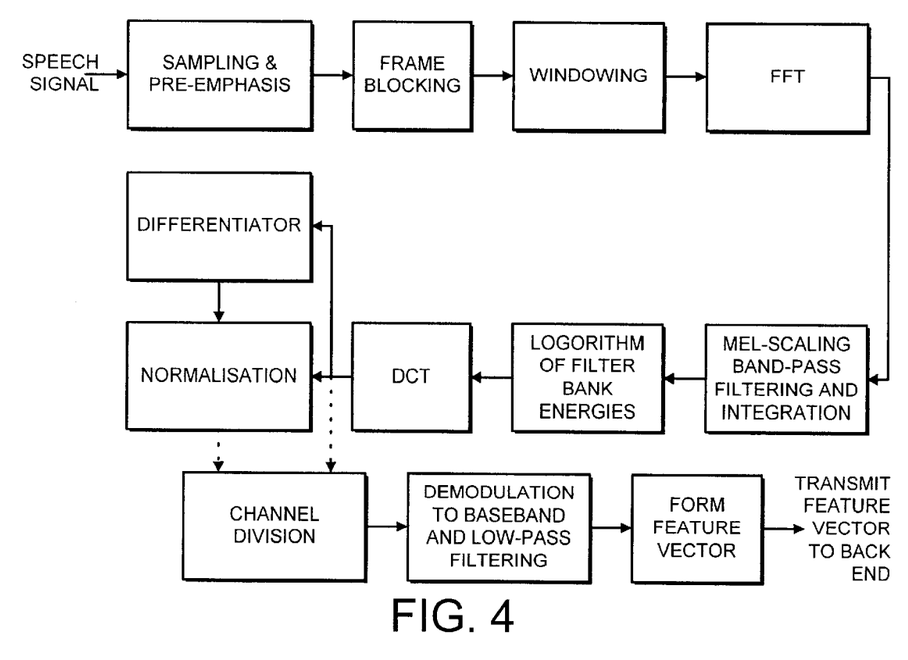
FIG. 4 is a block diagram of the preferred embodiment of the present invention.

In the introduction of this patent specification, an account has been given of how a cepstrum is formed in the front end of a typical DSR system and how MFCCs are generated. The method according to the preferred arrangement of the invention is located after the final functional block in the prior art FIG. 1, i.e. after the normalisation block as shown in FIG. 4. However, the normalisation block can be considered optional, although it is desirable in order to enhance performance of the speech recogniser in different environments (e.g. background noise conditions) and with different speakers. Thus, the basic requirement is for the new elements of the front end relating to the invention to be placed after the DCT block in FIG. 1.

Figure 3A:
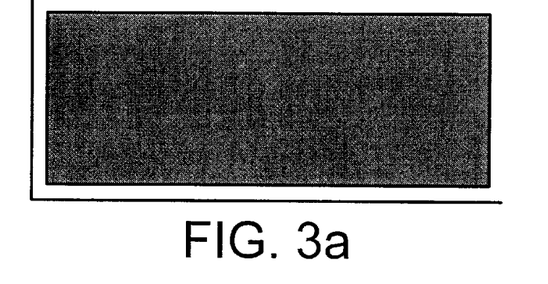
FIG. 3 illustrates the steps implementing a preferred embodiment of the present invention.
Figure 3B:
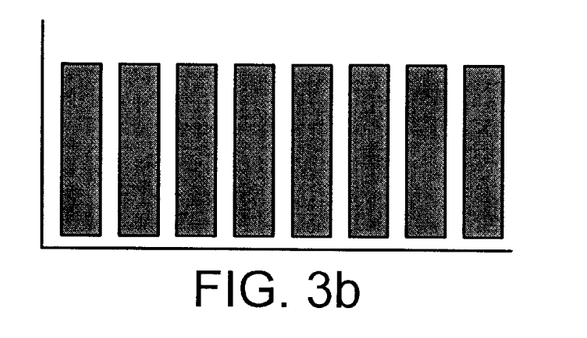
Figure 3C:
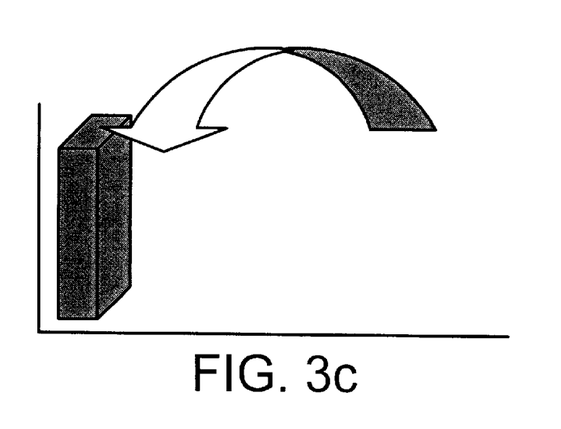

The method of the preferred embodiment involves dividing the cepstrum into N channels as illustrated in FIG. 3b, and demodulating the channels to the base-band as illustrated in FIG. 3c. As described in further detail below, division of the cepstrum is performed by applying band-pass filters to each of the time series representing the variation of individual mel-frequency cepstral coefficients. Specifically, each of the series of values representing the evolution of each individual MFCC with time is filtered into different frequency bands using a set of N digital filters. Each of the resulting N frequency bands (filtered time series) is referred to as a channel. In general, and as explained above, there are L MFCCs and thus there are L original time series. Division into channels results in the generation of L×N time series and hence there is an N-fold increase in dimensionality.

Figure 5:
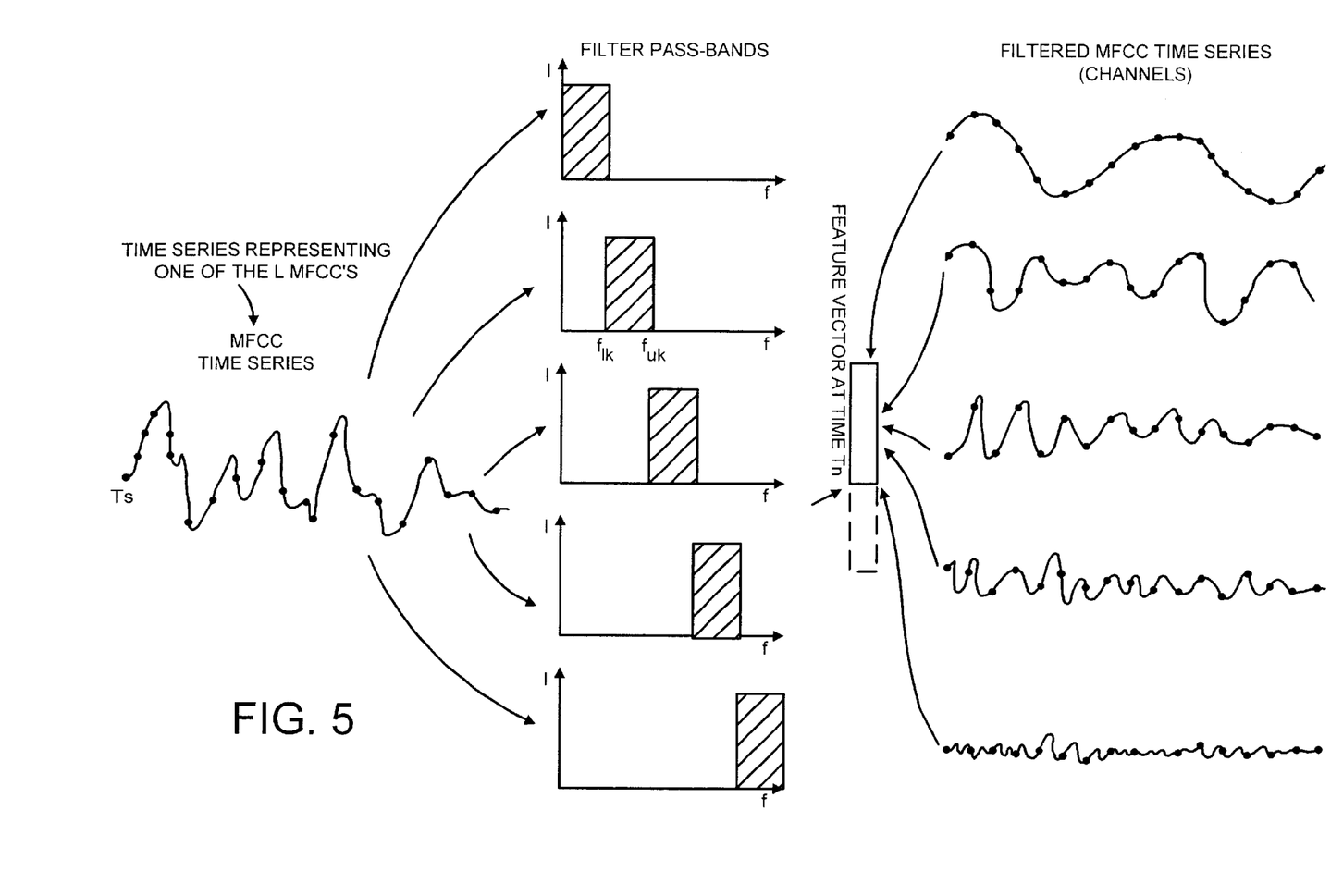
FIG. 5 illustrates one of the steps of the preferred embodiment in greater detail.

The process of division into channels is illustrated in further detail in FIG. 5. An example of an original time series, representing the evolution in time of one of the MFCCs, is shown at the left-hand-side of the figure. In the middle there is a frequency domain plot showing the passbands of the N digital filters used to derive the channels. The appearance of each of the filtered time series (channels) is shown at the right-hand-side of the figure. Optimally, each of the digital filters has an ideal rectangular pass-band with a frequency range from $f_{lk}$ to $f_{uk}$. Here $f_{lk}$ represents the lower pass-band cut-off frequency of the kth band-pass filter and $f_{uk}$ is the upper pass-band cut-off frequency of the kth band-pass filter, k being in the range 0 to N−1. Thus, each of the filtered time series that constitute the N channels contains frequencies in the range $f_{lk}$ to $f_{uk}$. If the total range of frequencies present in the time series representing one MFCC is DC to $f_{max}$ and that range is divided into N equal, non-overlapping channels, the frequency range of each channel is equal to $f_{uk}-f_{lk}=f_{max}/N$. It should be noted that the filter pass-bands illustrated in FIG. 5 have an ideal rectangular form and do not overlap. However, other filter transfer functions can be envisaged and application of the inventive method is in no way limited to this ideal non-overlapping band-pass filter configuration.

It has been found that division into channels in this way in itself is not sufficient to provide an improvement in speech recognition accuracy. The reason for this failure can be appreciated by examining the way in which the feature vectors are constructed. It should be remembered that with a fixed cepstral sampling rate of e.g. 10 ms, feature vectors can only be updated when a new cepstrum is computed i.e. once every 10 ms, the cepstral sampling rate. Therefore, the mere act of dividing each MFCC time series into separate frequency bands (channels) does not improve the representation of the higher frequency components. This means that the MFCC time series are modelled as a single entity although division into channels is performed.

In FIG. 5 the dots drawn on each of the filtered time series represent instants in time when new feature vectors are constructed. It should be noted that the waveforms representing different band-pass filtered versions of the MFCC variation are drawn as continuous functions of time. This is done purely for illustrative purposes and the waveforms represent the variation that would be observed if it were possible to monitor the evolution of the given MFCC with an infinitely small (or at least very small) sampling interval. In practice, the only measures of the MFCC channels that can be obtained are those indicated by the dots, representing the various filtered MFCC values at the discrete sampling intervals. In this case, division of each MFCC into different channels (i.e. different frequency bands) does not provide any direct advantage. High frequency variations in MFCC values are inevitably lost due to the insufficient sampling rate.

Figure 6:
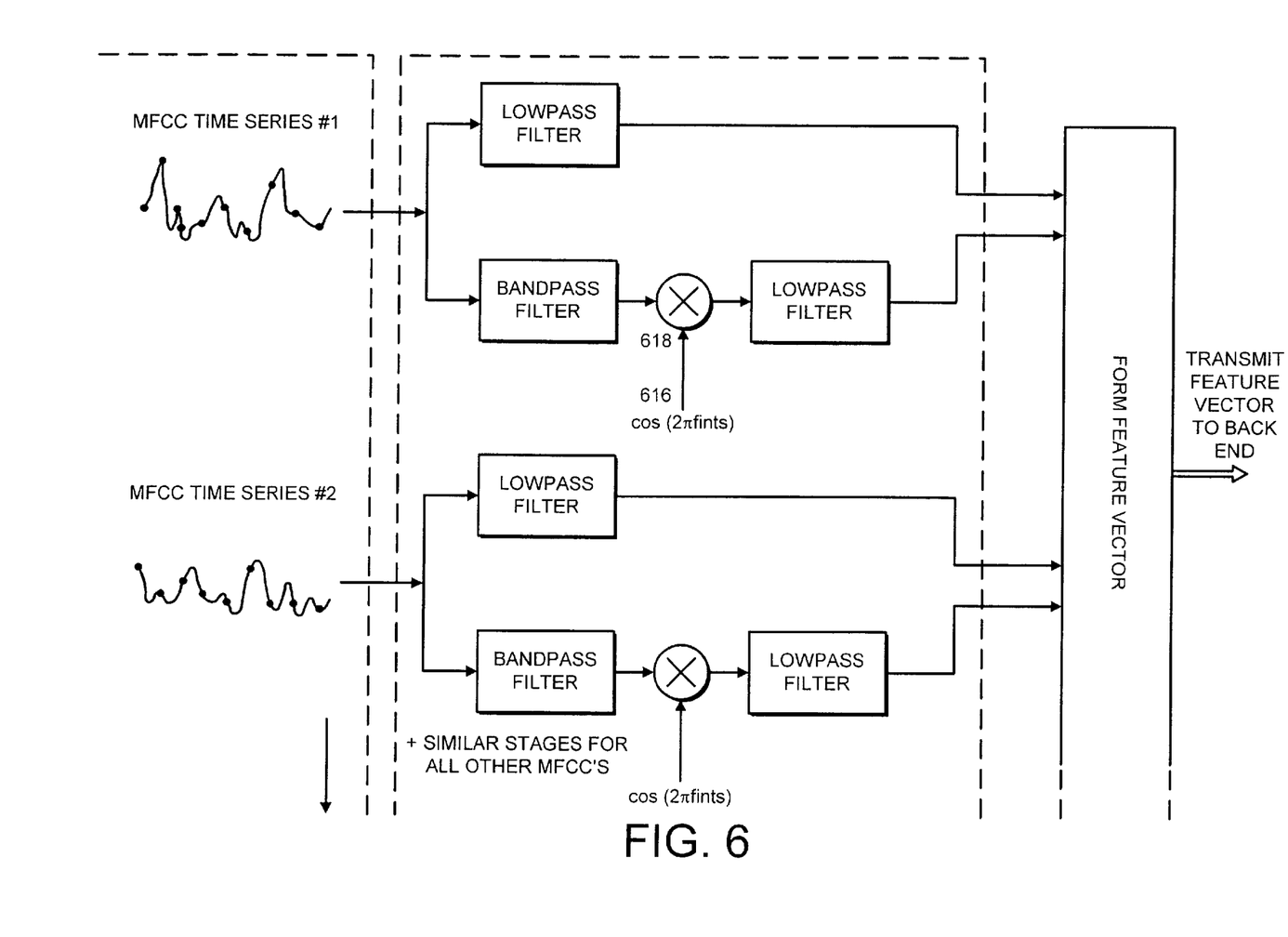
FIG. 6 illustrates a further step of the preferred embodiment in greater detail.

The improvement in performance provided by the invention results from the introduction of a demodulation step, performed on the channels derived from the individual MFCC time series (see FIG. 6). It is the demodulation step that enables additional information about the higher frequency variations of the MFCCs to be obtained. In the method according to a preferred embodiment of the invention, each of the channels, which represents the variation of a given MFCC in a particular frequency range (i.e. $f_{lk}$ to $f_{uk}$), is transformed (demodulated) to the frequency range of the lowest channel (i.e. DC to $f_{u0}$). This channel is referred to as the 'base-band' and the demodulation process is hereinafter referred to as 'demodulation to the baseband'. In general, the term base-band refers to a frequency range from 0 Hz (i.e. D.C.) to some given upper frequency. In general, the choice of this upper frequency is arbitrary, but in this case, the upper frequency of the base-band is determined by the division of the cepstral domain into channels/ bands. For example, if the entire cepstral frequency range is 0–50 Hz and it is decided to divide the cepstrum into 10 channels, the base-band, corresponding to the 'first' channel, occupies the frequency span from 0–5 Hz.

FIG. 6 illustrates the demodulation process for one MFCC time series. It is not necessary to demodulate the first channel, as it already occupies the frequency range DC to $f_{u0}$. From FIG. 6, it can be seen that demodulation is accomplished by multiplying each of the channels, except the lowest, by a cosine function. The demodulation effect arises from a fundamental mathematical (trigonometric) result concerning the multiplication of two sinusoidal (or cosinusoidal) functions. When two sine/cosine functions are multiplied together, the resulting waveform can be represented as a sum of two new sine/cosine functions. One of the new sine/cosine functions has a frequency equal to the difference of the original frequencies, while the other has a frequency equal to the sum of the original frequencies. For example, if two cosine functions, $\cos(2\pi f_1 t)$ and $\cos(2\pi f_2 t)$, are multiplied together, the resultant waveform can be represented as a sum of two terms, one with a frequency of $2\pi(f_1-f_2)t$, the other with a frequency of $2\pi(f_1+f_2)t$. The same result applies if a signal containing a range of frequencies is multiplied by a sine/cosine function. Effectively each of the frequency components contained in the range experiences the same effect as described above for individual frequencies. Thus, if a signal with frequencies in the range $f_l$ to $f_u$ is multiplied by a cosine function $\cos(2\pi f_1 t)$, two new signals are generated, one with a frequency range $(f_l-f_1)$ to $(f_u-f_1)$, the other with a frequency range $(f_l+f_1)$ to $(f_u+f_1)$.

This approach is used in the method according to the preferred embodiment of the invention. As stated previously, each of the N channels of a given MFCC time series has a frequency range of $f_{lk}$ to $f_{uk}$, where k is in the range 0 to N−1. By multiplying each channel by a cosine function with a frequency of $f_{lk}$ (i.e. $\cos(2\pi f_{lk} t)$), two new shifted frequency bands (i.e. shifted channels) are created, the lower of which occupies the frequency range 0 to $(f_{uk}-f_{lk})$, the upper of which has the frequency range $2f_{lk}$ to $(f_{uk}+f_{lk})$. Because $(f_{uk}-f_{lk})$ is equal to the channel width, it will be appreciated that the lower of the shifted channels now occupies the same frequency range as the lowest channel. In other words, it has been demodulated to the baseband. Thus, in the method according to the preferred embodiment, all channels, apart from the base-band itself, are multiplied by appropriately chosen cosine functions. In each case, the upper shifted channel produced by the multiplication (i.e. that with a frequency range $2f_{lk}$ to $(f_{uk}+f_{lk})$) is filtered out using a low-pass digital filter designed to pass only base-band frequencies and attenuate all others. FIG. 6 illustrates this process in the form of a functional block diagram, while FIG. 7, shows the effect of demodulation on the filtered MFCC time series, in a form analogous to FIG. 5.

Figure 7A:
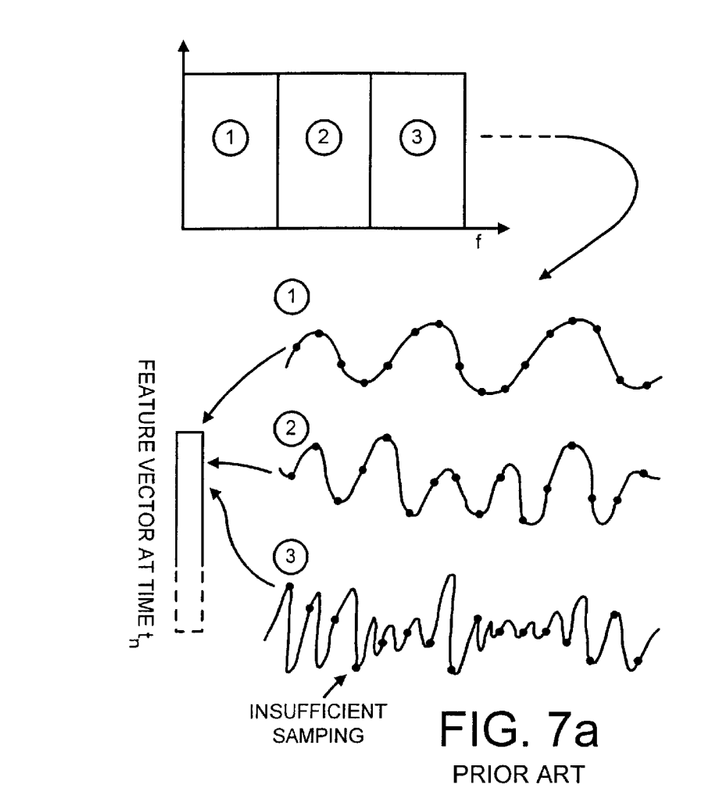
FIG. 7 illustrates a comparison of the prior art method with the method according to the preferred embodiment.
Figure 7B:
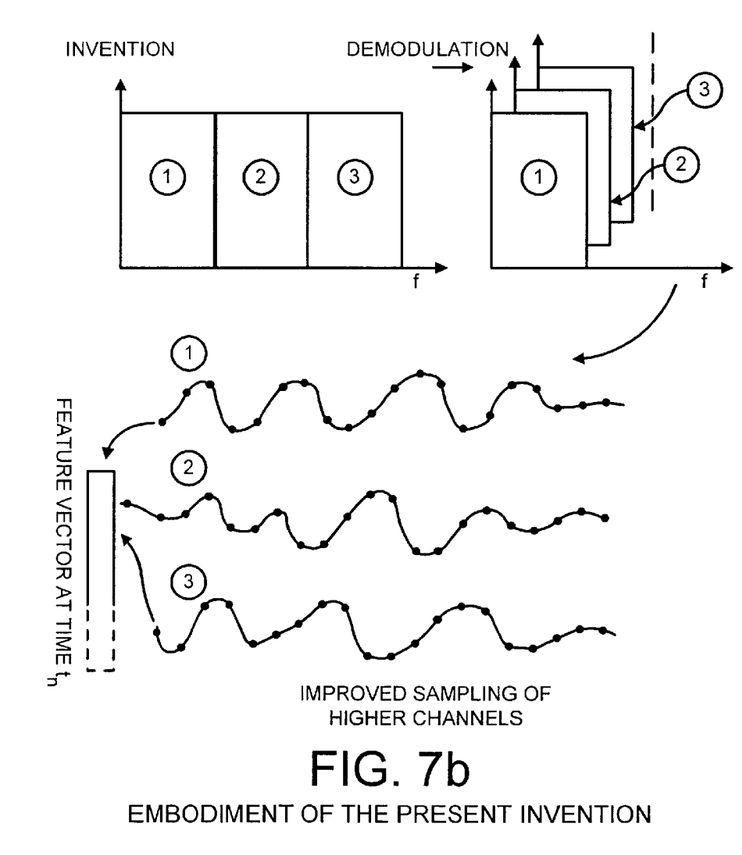

The principal advantage of the present invention can be better appreciated with reference to FIG. 7. In the demodulation process, the higher frequency variations of the MFCC time series, represented by the higher channels, are translated into lower frequency variations. This effectively overcomes the problem of insufficient sampling, highlighted earlier. Because the higher frequency variations of the higher channels are converted to lower frequency signals, the original sampling rate, e.g. 10 ms sampling, is now sufficient to represent the demodulated signals accurately. In fact, the lowest channel (base-band) and each demodulated channel can be represented equally well i.e. to an equivalent level of accuracy. Thus, the method according to the invention extracts extra information about the variation in the MFCC time series, overcoming the deficiencies in the prior art. In other words, by applying the method according to the invention, division of the MFCC time series into channels is properly exploited. The band-pass filtered MFCC time series are no longer modelled as a single entity. Instead, the cepstrum is treated as a series of entities and each of the entities is modelled as a discrete band, thus yielding improved recognition accuracy.

Next, the construction of feature vectors according to the preferred embodiment will be considered. As stated previously, the process of channel division, with or without demodulation, increases the number of MFCC time series by a factor of N. Therefore consideration needs to be given as to how to form feature vectors for transmission to the back end of a distributed speech recognition system (DSR). In a conventional DSR system, where channel division is not performed, a new feature vector is formed every time a new cepstrum is calculated and the feature vector typically comprises the cepstral coefficients themselves, as well as values from and first and second time derivative cepstra. By dividing each of the MFCC time series into N band-pass filtered channels, methods that employ channel division effectively increase by a factor of N the number of MFCC values that could be used to form feature vectors. This is true whether or not demodulation to the base-band is applied.

The simplest option would be to form feature vectors using all the available MFCC values every time a new cepstrum is calculated. This is basically an extension of the standard method and would result in an increase in the amount of data to be transferred by a factor of N. Thus, problems associated with the compression of feature vectors prior to transmission, highlighted earlier, would become more critical. Therefore, some form of dimensionality reduction is advantageous in order to reduce the requirements placed on the transmission channel between the front and back end of the speech recogniser. Dimensionality reduction is also desirable because Hidden Markov Models assume that all features are independent. Thus, increasing the dimensionality (i.e. the number of features) by a factor of N also yields an N-fold increase in the number of calculations that must be performed in the back end speech recogniser.

In order to address the issues introduced by the increase in the number of features available for transmission, the preferred embodiment includes an optional step of dimensionality reduction. Feature vectors can be formed using all the available MFCC values every time a new cepstrum is calculated. In other words, for every speech frame, features derived from each of the L×N band-pass filtered MFCC time series are placed in a feature vector and transmitted to the back end of the recogniser. Advantageously, however, the amount of data to be transferred is reduced prior to transmission. This may be achieved in a number of ways. A first method by which to decrease the dimensionality of transmitted feature vectors is to use a method known as 'decimation in time'. According to this approach, feature vectors are not transmitted every time a new cepstrum is calculated, but at multiples of the cepstral sampling interval. For example, if a new cepstrum is calculated every 10 ms i.e. the cepstral sampling interval is 10 ms, feature vectors containing all L×N available MFCC values are formed every n×10 ms. The value of n can be chosen according to e.g. the capacity of the data transmission channel. It should be noted that when n=N, the amount of data transferred is equivalent to that transmitted by a conventional DSR front end that does not use channel division. Here, it is necessary to consider the amount of information conveyed by the feature vectors. Because the preferred embodiment enables accurate representation of higher frequency changes in MFCC values, the information content of the feature vectors is increased. Thus, speech recognition accuracy improves even if feature vectors are transmitted less frequently. This point is illustrated with the following example. Consider that decimation in time is applied to the output of a DSR front end implementing the preferred method in such a way that a feature vector of length L×N is transmitted every N times the cepstral sampling interval (i.e. n=N). In this situation, the amount of data transferred is the same as in a conventional DSR front end that does not employ channel division and demodulation, but transfers a feature vector of length L to the back end every time a new cepstrum is calculated (i.e. at the basic cepstral sampling rate). In this case, although the two systems transfer the same amount of data, the system that operates according to the preferred embodiment of the invention provides superior speech recognition performance compared with the conventional system. Alternatively, decimation in time may be applied to selected ones of the MFCC channels, such that MFCCs from selected ones of said channels are transmitted more frequently than others. This approach may be used, for example, to emphasise the information content of certain channels.

It is known that feature vectors have linear correlations and thus they tend to contain a large amount of redundant information. It is therefore possible to eliminate the redundant information by performing some form of decorrelating operation, such as a Discrete Cosine Transform (DCT) or Linear Discriminant Analysis (LDA). Furthermore, an appropriately chosen function f may be applied to the plurality of base-band signals prior to modelling in order to reduce the dimensionality of the MFCC data. In general such a function has the form f(L×N→M) where L×N and M are the dimensions of the MFCC data before and after applying the function and L is the feature vector length prior to channel division. The symbol → represents the dimensionality reduction produced by applying the function. These methods provide another way in which the amount of data transferred to the back end of a DSR system may be reduced.

Decorrelation may be performed in a number of different ways. For example, MFCC values for each of the demodulated channels may be first combined and then a decorrelating transform, such as a DCT, performed. This approach allows a single Hidden Markov Model to be used in the back end speech recogniser. However, combination of the feature vectors may be problematic. It is possible to form a straightforward average of MFCC values, but this has not been found to provide the best results. Alternatively, a weighted average may be formed, for example giving more emphasis to MFCC values from the lower channels. Another option is to use a separate HMM for each of the channels and then combine the results. This approach has the disadvantage that a large number of feature vectors must be analysed and the redundancy in the data is retained until a later stage in the processing.

In tests carried out using preferred methods and apparatus of the present invention, names were spoken by male and female speakers. The recordings were carried out in office environments during different sessions at different times during the day. Continuous Gaussian density left-to-right state duration constrained Hidden Markov models with a global variance vector or estimated with a single training utterance. Results obtained with the MFCC front-end applied to 10 Hz to 20 Hz band in the cepstral trajectory with and without moving to the base-band, so called demodulation, respectively. As has been mentioned, the MFCC based front end produces 13 cepstral coefficients including the energy value. The results show that an MFCC front end that implements demodulation of MFCC time series according to the preferred embodiment provides significant improvement in speech recognition accuracy. In this context, recogntion accuracy is the number of times a word is correctly identified expressed as a percentage of the total number of recognitions performed. It has been shown that when using demodulation recognition accuracy improved from 13.33% to 51.4%.

Examples of applications of the invention include name and/or number dialling and enhancement of hands free operation, particularly in cars where manipulation of the handset is more difficult. More advanced applications of the invention include its use in large vocabulary distributed speech recognition and applications such as automatic dictation (speech to text conversion).

The present invention may be embodied in other specific forms without departing from its essential attributes. For example, although the preferred embodiments according to the invention have been described in terms of its application in a distributed speech recogntion (DSR) system, where the front-end resides in a mobile terminal and the back-end is part of a fixed network, this is not a necessary limitation. The invention may be applied equally well in a situation where the front and back ends are located at the same place (i.e. in the same equipment). Furthermore, whilst the specific description has referred to the mel-cepstrum, the speech representation can be any discrete form time series (at any time instant, a vector of values) including auditory modelling based representations inspired by the human auditory system. Accordingly, reference should be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for use in a speech recognition system in which a speech waveform to be modelled is represented by a set of feature extracted parameters, said method comprising dividing individual ones of one or more of said feature extracted parameters to provide in respect to each divided feature extracted parameter a plurality of frequency channels, demodulating one or more of the plurality of frequency channels to provide respective one or more corresponding baseband frequency signals and applying dimensionality reduction to said at least one of said one or more baseband frequency signals.

2. A method according to claim 1, further comprising modelling respective ones of said demodulated plurality of baseband signals independently after the step of dimensionality reduction.

3. A method according to claim 1, further comprising modelling respective ones of said demodulated plurality of baseband signals in a combined manner after the step of dimensionality reduction.

4. A method according to claim 1, further wherein the step of demodulating comprises demodulating the plurality of frequency channels derived from dividing a feature extracted parameter, and wherein the step of applying dimensionality reduction comprises applying dimensionality reduction to said plurality of baseband frequency signals derived from said demodulating step.

5. A method according to claim 1, further comprising applying a function f to said plurality of baseband signals prior to modelling, wherein said function f is given by f (N*l→M), where N*l and M are input and output dimensions and l is the feature vector length prior to channel division.

6. A method according to claim 1, further comprising forming a feature vector by applying a transform f to {b(1), d(2) . . . d(n)}.

7. Apparatus for speech recognition in which a speech waveform to be modelled is represented by a set of feature extracted parameters, said apparatus comprising means for dividing individual ones of one or more of the feature extracted parameters to provide for each divided feature extracted parameter a plurality of frequency channels, means for demodulating one or more of the plurality of frequency channels to provide respective one or more corresponding baseband frequency signals, and means for applying dimensionality reduction to at least one of the one or more baseband frequency signals.

8. Apparatus according to claim 7, further comprising means for modelling respective ones of the demodulated plurality of baseband signals independently following said means for dimensionality reduction.

9. Apparatus according to claim 7, further comprising means for modelling respective ones of the demodulated plurality of baseband signals in a combined manner following said means for dimensionality reduction.

10. Apparatus according to claim 7, wherein said means for demodulating comprises means for demodulating the plurality of frequency channels derived from said dividing means, and wherein said means for applying dimensionality reduction comprises means for applying dimensionality reduction to the plurality of baseband frequency signals derived from said demodulating means.

11. Apparatus according to claim 7, further comprising means for applying a function f to the plurality of baseband signals prior to modelling wherein the function f is given by f (N*l→M), where N*l and M are input and output dimensions and l is the feature vector length prior to channel division.

12. Apparatus according to claim 7, further comprising means for forming a feature vector by applying a transform f to {b(1), d(2) . . . d(n)}.

13. A speech recognition system for a radio communication system including a mobile station operating in a radio network, said speech recognition system comprising a front-end feature extraction means disposed in the mobile station, a back-end recognition means associated with the network, and apparatus for speech recognition in which a speech waveform to be modelled is represented by a set of feature extracted parameters, said apparatus comprising means for dividing individual ones of one or more of the feature extracted parameters to provide for each divided feature extracted parameter a plurality of frequency channels, means for demodulating one or more of the plurality of frequency channels to provide respective one or more corresponding baseband frequency signals, and means for applying dimensionality reduction to said at least one of said one or more baseband frequency signals.

14. A computer program product for a speech recognition system in which a speech waveform to be modelled is represented by a set of feature extracted parameters, the computer program product comprising means for dividing individual ones of one or more of said feature extracted parameters to provide for each divided feature extracted parameter a plurality of frequency channels, means for demodulating one or more of the plurality of frequency channels to provide respective one or more corresponding baseband frequency signals, and means for applying dimensionality reduction to at least one of the one or more baseband frequency signals.

15. An article, comprising a storage medium having instructions stored thereon, the instructions when executed using a speech recognition system, in which a speech waveform to be modelled is represented by a set of feature extracted parameters, by dividing individual ones of one or more of the feature extracted parameters to provide in respect to each divided feature extracted parameter a plurality of frequency channels, demodulating at least one of the plurality of frequency channels to provide at least one corresponding baseband frequency signal, and applying dimensionality reduction to a plurality of baseband signals.

* * * * *